United States Patent Office 3,560,510
Patented Feb. 2, 1971

3,560,510
2-BENZHYDRYLQUINUCLIDINES
Edward John Warawa, Milwaukee, Wis., assignor to Aldrich Chemical Company, Inc., Milwaukee, Wis.
No Drawing. Filed Mar. 5, 1969, Ser. No. 804,691
Int. Cl. C07d 39/06
U.S. Cl. 260—293
19 Claims

ABSTRACT OF THE DISCLOSURE

Compounds of the formula

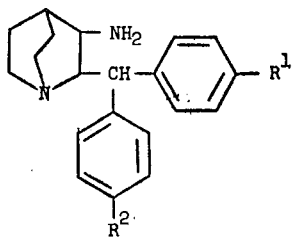

where $R^1$ and $R^2$ are both hydrogen, chloro, bromo, fluoro, trifluoromethyl, methoxy, methylenedioxy or amino; and the pharmaceutically acceptable nontoxic salts thereof exhibit diuretic activity and are useful as diuretic agents in mammals to promote the excretion of water and sodium.

BACKGROUND OF THE INVENTION (1) Field of the invention

This invention relates to novel compounds exhibiting diuretic activity which are useful as diuretic agents in mammals. In another aspect this invention relates to a method of preparing the novel compounds.

(2) Description of the prior art

An object of the present invention is to provide compounds which would be of value as diuretic agents. While some compounds having such activity are known in the art there is a need for new agents which promote the excretion of water and sodium with little increase in potassium excretion.

SUMMARY OF THE INVENTION

There is provided according to the present invention compounds represented by the following formula

I

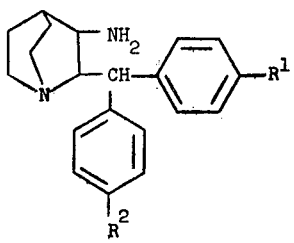

where $R^1$ and $R^2$ are both hydrogen, chloro, bromo, fluoro, trifluoromethyl, methoxy, methylenedioxy, or amino; and the pharmaceutically acceptable nontoxic salts thereof.

The pharmaceutically acceptable nontoxic salts include the organic and inorganic acid addition salts, e.g., those prepared from acids such as hydrochloric, sulfuric, sulfonic, tartaric, fumaric, hydrobromic, hydriodic, glycolic, citric, maleic, phosphoric, succinic, acetic and the like. Such salts are prepared by conventional methods by re-acting the free base with the desired acid on about an equimolar basis.

A preferred embodiment of the present invention consists of the compounds of the formula

II

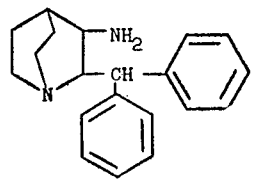

and the nontoxic salts thereof. Particularly preferred is the cis-isomer of the compound of Formula II.

The compounds of this invention have more than one asymmetric center and can, therefore, be present in the form of a mixture of diastereoisomers, racemates or optically active antipodes. Mixtures of diastereoisomers may be separated as exemplified below into the individual racemic compounds on the basis of physico-chemical differences for example by chromatography or fractional crystallization. The racemates are resolved into the optical isomers according to known resolution procedures for example, by resolution with an optically active acid, e.g., mandelic acid by the procedure used on amines e.g., α-phenethylamine, amphetamine.

The cis and trans isomers of the compounds of Formula I are conveniently obtained by isolating the cis or trans isomer from a mixture of cis and trans 2-benzhydryl-3-(N-benzyl)aminoquinuclidines of Formula III by chromatography and then debenzylating catalytically the cis or trans isomer to the cis or trans isomer of a compound of Formula I as described below. Alternatively a mixture of cis and trans quinuclidines of Formula I are reacted with acetic anhydride to produce the 3-acetamido derivatives of the formula

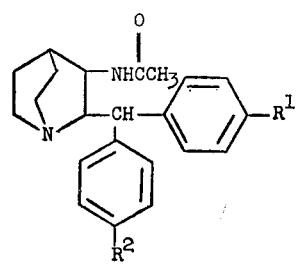

wherein $R^1$ and $R^2$ are as described above as a mixture of cis and trans isomers. The individual cis and trans isomers are separated by recrystallization from isopropanol. Hydrolysis of the cis or trans-3-acetamido derivative with a strong acid e.g., hydrochloric, gives the cis and trans isomer of the compounds of Formula I.

The compounds of this invention (Formula I) are prepared by hydrogenolytic debenzylation of a 2-benzhydryl-3-(N-benzyl)aminoquinuclidine of the formula

III

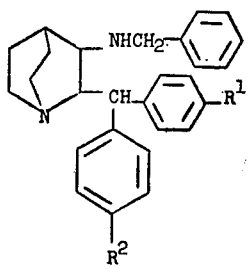

wherein $R^1$ and $R^2$ are described above.

Debenzylation of the compounds of Formula III to produce the products of this invention is preferably performed by hydrogenolysis of a compound of Formula III in the presence of a catalyst such as palladium-on-charcoal, platinum or Raney nickel. Hydrogenolysis is carried out at elevated pressure e.g., 60–3000 p.s.i. but preferably about 100 p.s.i. and at a temperature of from about room temperature to about 150° C. but preferably at about 75° C. for several hours and in the presence of a nonreactive solvent e.g., methanol, ether, isopropanol and the like.

The compounds of Formula III as exemplified below are prepared by the following series of reactions:

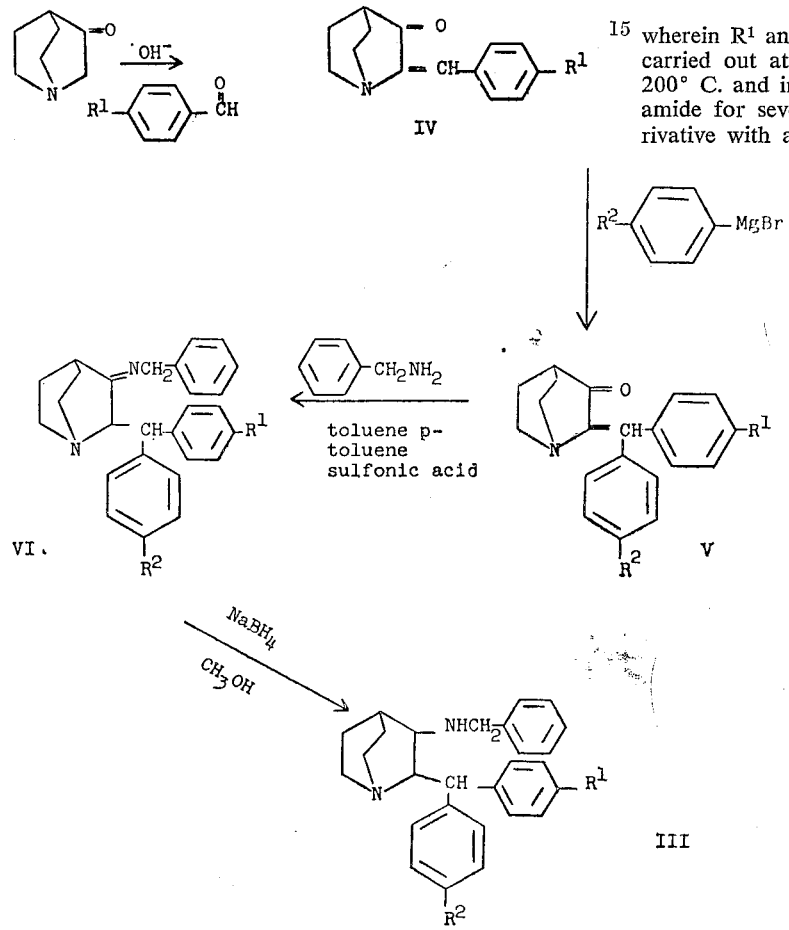

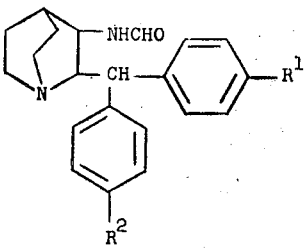

of Formula V with at least an equimolar weight of ammonium formate (formic acid and ammonia) to produce the formyl derivative of the formula

II wherein $R^1$ and $R^2$ are described above. The reaction is carried out at elevated temperature, for example 100–200° C. and in the presence of a solvent such as formamide for several hours. Hydrolysis of the formyl derivative with a strong acid e.g., hydrochloric acid prefwherein $R^1$ and $R^2$ are as described above.

3-quinuclidinone is reacted according to the general procedure described by G. R. Clemo et al., J. Chem. Soc., 1939, 1241 and V. Braschler et al., Helv. Chim. Acta 46, 2646 (1963) with an unsubstituted or substituted benzaldehyde in a solvent e.g., ethanol and in the presence of a base e.g., sodium hydroxide to produce a 2-benzylidenyl-3-quinuclidinone (IV). The 2-benzylidenyl-3-quinuclidinone (IV) is subjected to a Grignard reaction with a magnesium bromobenzene in a mixture of ether-benzene to yield a 2-benzhydryl-3-quinuclidinone (V). 2-benzhydryl - 3 - (N-benzyl)iminoquinuclidines (VI) are obtained by reacting a 2-benzhydryl-3-quinuclidinone with benzylamine in refluxing toluene in the presence of catalytic amounts of p-toluene sulfonic acid. The water formed in the reaction is removed azeotropically. Sodium borohydride reduction of a 2-benzhydryl-3-(N-benzyl)iminoquinuclidine yields the corresponding 2-benzhydryl-3-(N-benzyl)aminoquinuclidine (III) which contains approximately 95% of the cis-form. Recrystallization from isopropyl alcohol affords the pure cis-isomer.

Alternatively the compounds of this invention are prepared by the reaction of a 2-benzhydryl-3-quinuclidinone erably at elevated temperature e.g., reflux temperature produces the compounds of this invention. The foregoing reaction scheme is the Leuckart Reaction and is described by Fieser and Fieser in "Advanced Organic Chemistry" 1961 at pages 496–497.

The trans form of the compounds of Formula I is conveniently produced by reduction of a trans-3-azido derivative of the formula

VIII

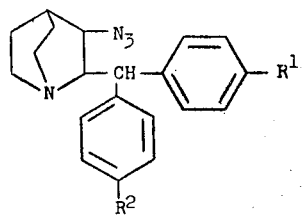

wherein $R^1$ and $R^2$ are as described above with for example lithium aluminum hydride in the presence of a nonreactive solvent e.g., ether.

The compounds of Formula VIII are prepared as exemplified below by reaction of a cis-2-benzhydryl-3-quinuclidinol of the formula

IX

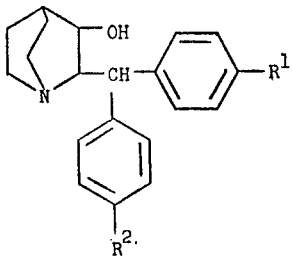

wherein $R^1$ and $R^2$ are as described above with mesyl chloride in the presence of an acid acceptor e.g., pyridine to produce a cis-2-benzhydryl-3-quinuclidinol mesylate of the formula

X

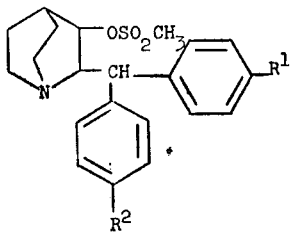

wherein $R^1$ and $R^2$ are as described above. Reaction of the cis-2-benzhydryl-3-quinuclidinol mesylate of Formula X with an inorganic azide e.g., sodium azide in a liquid medium produces a compound of Formula VIII. Suitable liquid media include dimethyl acetamide and ether.

The compounds of this invention possess a high degree of diuretic activity and are useful in mammals to promote the excretion of water and sodium.

Tests of the compounds of this invention for diuretic activity were carried out in the rat and the dog. The compounds were administered orally and the activity compared with that of a commercial diuretic product, hydroflumethiazide. When cis-2-benzhydryl-2-aminoquinuclidine fumarate was tested it exhibited a minimal effective dose (MED) of 16 mg./kg. in the dog. The activity in the rat was equal to that of 25 mg./kg. of hydroflumethiazide and in the dog the activity was equal to that obtained with an equal weight of hydroflumethiazide. Cis-2-aminoquinuclidine was active at 10 mg./kg. in the dog. The trans isomer was approximately one third as active as the cis isomer in the dog. The tests also indicated that the sodium/potassium excretion ratio was greater in the dog for cis-2-benzhydryl-2-aminoquinuclidine fumarate than that for hydroflumethiazide. Hence the compounds of this invention produce less potassium excretion than hydroflumethiazide.

The compounds of this invention may be administered as the free bases or in the form of their nontoxic addition salts. They may be compounded and formulated into pharmaceutical preparations in unit dosage form for oral or parenteral administration with organic or inorganic solid materials or liquids which are pharmaceutically acceptable carriers. Some examples of the carriers which can be used are gelatin capsules, sugars, cellulose derivatives such as carboxymethylcellulose, gelatin, talc, magnesium stearate, vegetable oil such as peanut oil, etc., liquid petroleum, glycerin, sorbitol, ethanol, agar, elixirs, syrups and water including sterile water. The compositions may take the form of tablets, powders, granules, capsules, suspensions, solutions, and the like.

The compounds of this invention when administered orally or parenterally in a diuretic amount are effective in promoting diuresis in mammals. An oral dosage range of at least about 10 milligrams per kilogram of body weight per day is convenient which may be administered in divided dosage, e.g., two, three or four times a day. Administration of the compounds is conveniently begun at the minimal effective dose (MED) of the particular compound in the particular species of mammal. However, in general, the particular dosage most suitable for a particular application, as might be expected, will vary with the age, weight and general health of the mammal under treatment and the degree of diuretic effect required. After taking into consideration these factors and any other factors to be considered, one skilled in the art of treating diseases of mammals can readily determine the appropriate dosage.

The following examples are intended to illustrate the invention described herein without unduly restricting it.

EXAMPLE 1

2-benzyhydryl-3-quinuclidinone

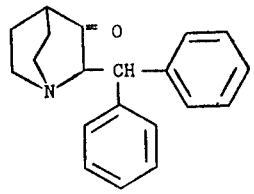

The Grignard reagent was prepared using 17.75 g. (0.113 M) of bromobenzene in ca. 200 ml. of anhydrous ether and 3.02 g. (0.124 M) of magnesium turnings. After it had refluxed for three hours, it was cooled with a cold water bath while 16.00 g. (0.0752 M) of 2-benzylidenyl-3-quinuclidinone in 350 ml. of benzene was added dropwise over a period of three hours after which it was stirred overnight at room temperature. After ca. 10 ml. of water was cautiously added dropwise, it was stirred at room temperature for 0.75 hour and then filtered through Celite (diatomaceous earth), the magnesium salts being washed thoroughly with tetrahydrofuran.

This filtrate was combined with the filtrate from another run using the same quantities as above. Removal of the solvents in vacuo left an orange liquid residue which was extracted with methylene chloride and dried with magnesium sulfate. Removal of the drying agent and concentration in vacuo left a viscous orange residue which crystallized from ethanol. The crude material was collected by suction filtration giving 32.8 of yellow solid, M.P. 105–118° C. Recrystallization from ethanol (charcoal) gave two crops of white solid: (1) 23.6 g., M.P. 120.1–123.5° C.; (2) 1.23 g., M.P. 113–125.5° C. The second crop was combined with the mother liquor from the recrystallization and concentrated to a volume of ca. 60 ml. Two more crops of white solid were collected: (1) 3.43 g., M.P. 118–121° C.; (2) 1.59 g., M.P. 119–124° C. The infrared spectrum for all crops showed none of the tertiary alcohol by-product present. The total yield was 28.6 g. (51.8% of theory).

EXAMPLE 2

2-benzhydryl-3-N-benzyliminoquinuclidine

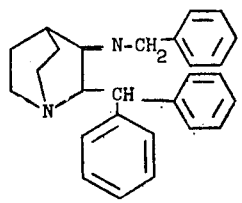

2-benzhydryl-3-quinuclidinone (2.4 g., 0.0083 mole) and benzylamine (0.9 g., 0.0083 mole) was refluxed azeotropically in toluene in the presence of p-toluenesulfonic acid for 48 hours. Upon cooling and concentration in vacuo, the resulting residue was triturated with ethanol, and the solid was collected by filtration to yield 2.03 g.

$$\lambda_{max.}^{Nujol} 5.99\mu$$

Recrystallization from ethanol gave 1.25 g., M.P. 160–165° C.; and drying in a drying pistol gave the analytical specimen, M.P. 160–165° C.;

$$\lambda_{max.}^{Nujol} 5.99\mu$$

*Analysis.*—Calc'd for $C_{27}H_{28}N_2$ (percent): C, 85.22; H, 7.42; N, 7.32. Found (percent): C, 85.54; H, 7.58; N, 7.56.

EXAMPLE 3

Cis and trans-2-benzhydryl-3-benzylaminoquinuclidine

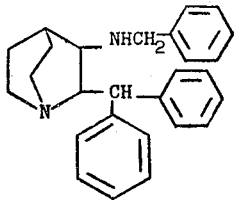

(A) 2-benzhydryl-3-quinuclidinone, 2.4 g. (0.0083 mole), benzylamine, 2.0 g. (0.0018 mol.) and 100 mg. of p-toluene sulfonic acid was refluxed azeotropically in toluene solution overnight until 1.1 ml. of water had collected. The solution was cooled to room temperature and the solvent was removed in vacuo to yield a white solid from which the remaining benzylamine was removed with a vacuum pump;

$$\lambda_{max.}^{Nujol} 6.01\mu$$

A solution of 100 ml. of methanol-methylene chloride (1:1) was placed in an Erlenmeyer and cooled in an ice water bath. A portion of the $NaBH_4$ from the 1.0 g. being used was added to this solution and then the crude Schiff base was added. The remainder of the $NaBH_4$ was then added portionwise over 30 minutes and the solution was stirred overnight at room temperature. Solvent was removed in vacuo to yield a solid residue which was triturated with water and collected by filtration. This solid was washed well with water and dried on a steam bath to yield 3.08 g.;

$$\lambda_{max.}^{Nujol} 2.99 \text{ (weak)} \mu$$

Recrystallization from isopropanol (with charcoal treatment) gave 2.1 g., M.P. 141–142° C. The analytical specimen was obtained by drying this material in a drying pistol and showed M.P. 141–143° C.;

$$\lambda_{max.}^{Nujol} 2.98 \text{ (weak)}$$

13.30–13.57 (S): 14.35 (S)$\mu$.

*Analysis.*—Calc'd for $C_{27}H_{30}N_2$ (percent): C, 84.77; H, 7.91; N, 7.32. Found (percent): C, 84.51; H, 7.91; N, 7.29.

(B) A solution of 200.0 g. (0.687 mole) of 2-benzhydryl-3-quinuclidinone, 147.0 g. (1.37 mole) of benzylamine, 800 ml. of toluene, and 100 mg. of p-toluenesulfonic acid was refluxed for 13.5 hours while the water was collected with a Dean-Stark trap. A total of ca. 12.5 ml. of water was collected (theory: 12.5 ml.). Then the reaction mixture was concentrated in vacuo leaving a light yellow solid which by its infrared spectrum was the Schiff base with none of the starting ketone present. The crude product was first dissolved in 700 ml. of $CH_2Cl_2$ and then 700 ml. of ethanol was added. While this solution was cooled with an ice bath, 40 g. (1.13 mole) of sodium borohydride was added portionwise over a period of 2 hours. After stirring the reaction mixture overnight at room temperature, the solvents were removed in vacuo leaving a light yellow solid to which was added ca. 2 l. of water followed by stirring with a mechanical stirrer for 0.5 hour. The resulting yellow precipitate was collected by suction filtration, washed with water, and then dissolved in ca. 1 l. of $CH_2Cl_2$ which was dried over $MgSO_4$. Removal of the drying agent and concentration in vacuo left 263.3 g. (theory: 262 g.) of a light yellow solid having a noticeable odor of benzylamine (carried over from the Schiff base formation). The crude material was dissolved in a hot solution of 100 ml. of methanol and 2650 ml. of isopropanol and then concentrated to ca. 2 l. A first crop of 212.3 g. of white solid, M.P. 141.5–145.0° C., was ca. 85% cis isomer and ca. 15% trans isomer as determined by TLC (micro alumina plate; ether; $I_2$—thin layer chromatography).

EXAMPLE 4

2-benzhydryl-3-aminoquinuclidine

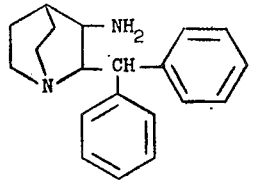

2-benzhydryl-3-benzylaminoquinuclidine, 22 g. (0.06 M) prepared according to the procedure of Example 3A, was dissolved in methanolic-HCl solution containing a slight excess of acid. The solvent was removed in vacuo and the residue was taken up in 250 ml. of methanol and hydrogenated at 100 lbs. and 75° C. for 3 hours with 5 g. of 10% Pd/C catalyst. The catalyst was removed by filtration through Celite and solvent was removed in vacuo. This residue was treated with aqueous NaOH solution and extracted with $CH_2Cl_2$ which was washed three times with water and dried with $MgSO_4$. Removal of the drying agent by filtration and concentration in vacuo gave 18 g. of a yellow solid. Thin layer chromatography (TLC) analysis was carried out on alumina (micro plates) by developing with ether and detection with $I_2$. This material showed two components—one near the base line and another faster moving compound which had the same Rf as the starting benzylamine. Therefore, 16 g. of this material was dissolved in $CH_2Cl_2$, treated with 50 g. of neutral alumina and then taken to dryness. This material was applied to a column of 460 g. of neutral alumina packed in pet-ether. A gradient elution was then conducted with ethyl ether: pet-ether (3 liters of the latter). One hundred ml. fraction were collected and analyzed by TLC as above.

Results: Fraction 10–22=5.2 g., M.P. 142–151° C., same Rf as the benzylamine:

23=0.68 g., mixture

24–43=6.27 g., slow moving component.

At this point very little material was being eluted and gradient elution was terminated. The column was then eluted with ether and 10% MeOH-ether. This gave a solid which was dissolved in $CH_2Cl_2$, filtered and concentrated to yield 3.2 g. Total eluted material was 15.35 g.

The 6.27 g. fraction was recrystallized from heptane to yield a first crop of 4.45 g., M.P. 183–185° C. This material was dried in the drying pistol to give the analytical specimen, M.P. 183–185° C.;

$$\lambda_{max.}^{Nujol} 2.97 \text{ (weak)} \mu$$

*Analysis.*—Calc'd for $C_{20}H_{24}N_2$ (percent): C, 82.14; H, 8.27; N, 9.58. Found (percent): C, 82.40; H, 8.19; N, 9.12.

EXAMPLE 5

Cis-2-benzhydryl-3-N-benzylaminoquinuclidine

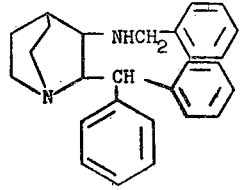

Twenty-five grams of the mixture of isomers (ca. 85% cis, 15% trans) prepared according to Example 3B, absorbed on 150 g. of neutral alumina by mixing in $CH_2Cl_2$ and removing solvents in vacuo, was applied to 1850 g. of neutral alumina packed in petroleum (pet) ether. The column was eluted with 1 l. of pet ether, 2 l. of 5% benzene-pet ether, 3 l. of 10% benzene-pet ether, 4 l. of 15% benzene-pet ether, 2 l. of 25% of benzene-pet ether and 2 l. of 50% benzene-pet ether. After eluting with 1 l. of benzene, the cis isomer began to elute. Continued elution gave 14.5 g. of the pure cis isomer as indicated by the TLC (micro alumina plate; ether; $I_2$), M.P. 149–151° C. A sample on recrystallization from isopropanol and drying in a drying pistol showed M.P. 151.5–152° C.

*Analysis.*—Calc'd for $C_{27}H_{30}N_2$ (percent): C, 84.77; H, 7.91; N, 7.32. Found (percent): C, 85.12; H, 8.00; N, 7.41.

EXAMPLE 6

Cis-2-benzhydryl-3-aminoquinuclidine

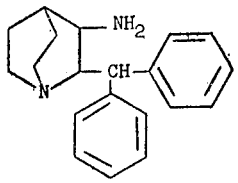

(a) Debenzylation to cis-2-benzhydryl-3-aminoquinuclidine

Cis-2-benzhydryl-3-N-benzylaminoquinuclidine, 6.0 g., was dissolved in methanol, treated with HCl (g.) slightly in excess of two equivalents, and the solution was concentrated in vacuo. The residue was again dissolved in methanol and hydrogenated with 4 g. of 10% Pd/C catalyst at 100 p.s.i. and 100° C. for 6 hours. The catalyst was removed by filtration, and the filtrate was concentrated in vacuo, and the residue was treated with dilute NaOH solution and extracted with $CH_2Cl_2$. This organic extract was washed with saturated sodium chloride solution and dried with magnesium sulfate. Filtration and concentration in vacuo yielded 4.36 g. (theory: 4.59 g.), M.P. 181–183° C. TLC analysis on micro alumina plates using ether and $I_2$ detection showed complete absence of the N-benzyl precursor and 5% isopropanol-ether with $I_2$ detection indicated the presence of only cis-2-benzhydryl-3-aminoquinuclidine.

(b) Cis-2-benzhydryl-2-aminoquinuclidine fumarate

Cis-2-benzhydryl-3-aminoquinuclidine, 42.1 g. (0.144 mole), was dissolved in ca. 1200 ml. of hot isopropanol. A solution of 16.7 g. (0.144 mole) of fumaric acid was prepared by treating the acid with 425 ml. of isopropanol and concentrating to 225 ml. The hot amine solution was then added to the hot fumaric acid solution, rinsing with a little more isopropanol. The solution was kept hot for the purpose of removing some isopropanol but within a few minutes the solution became turbid and a solid started to separate. Heating was continued for ca. 10 minutes and then the solution was refrigerated overnight. The solid was collected by filtration and dried in a vacuum oven for 3 hours at 70–75° C. Yield 53.0 g. (theory 58 g.), M.P. 215–217° C.

*Analysis.*—Calc'd for $C_{24}H_{28}N_2O_4$ (percent): C, 70.56; H, 6.91; N, 6.86. Found (percent): C, 70.20; H, 6.99; N, 6.86.

(c) Cis-2-benzhydryl-3-aminoquinuclidine via chemical separation (1) Cis-2-benzhydryl-3-acetamidoquinuclidine.—To a suspension of 28.0 g. (0.0733 mole) of cis and trans-2-benzhydryl-2-N-benzylaminoquinuclidine (ca. 5:1) in 250 ml. of methanol was added HCl (g.) until solution was effected. Then the solvent and excess HCl was removed in vacuo leaving a light yellow oil which was dissolved in ca. 300 ml. of methanol and was hydrogenated at 90° C. and 350 p.s.i. for 4.25 hours using 14.0 g. of 10% Pd/C. After the catalyst was separated by suction filtration through Celite, the filtrate was concentrated in vacuo leaving an oil which was dissolved in water and made alkaline with dilute NaOH. The product was extracted with $CH_2Cl_2$, the organic layer being dried over $MgSO_4$. Removal of the drying agent and concentration in vacuo left 21.2 g. (99%) of a white solid which by TLC (micro alumina plate; ether; $I_2$) did not contain any of the starting material and was ca. 5:1 mixture of cis and trans isomers.

A solution of the above amine mixture and 74 g. (0.726 mole) of acetic anhydride in 450 ml. of anhydrous pyridine was heated at 85° C. for 6.5 hours using an oil bath. After stirring at room temperature overnight, the reaction mixture was cooled with an ice bath and dilute NaOH solution was added until the reaction mixture was basic. Then the reaction mixture was stirred at room temperature for 0.5 hour, extracted with $CH_2Cl_2$, washed twice with saturated saline solution and dried over $MgSO_4$. Removal of the drying agent and solvent left 24.7 g. of a yellow solid. By TLC (micro alumina plate; 5% isopropanol-ether; $I_2$), the crude material contained a trace of the starting amine and a mixture of the two isomeric amides. Recrystallization from isopropanol gave 15.2 g. of a white solid melting at 258–263° C. By TLC the first crop contained a trace of the amide which was least predominant in the crude material. Another recrystallization from isopropanol gave 11.0 g. (45.4% of theory) of a white solid, M.P. 265–266° C., which was one spot by TLC;

$\lambda_{max.}^{Nujol}$ 3.02 (m.)

6.03 (m.), 6.10 (S)$\mu$.

(2) Hydrolysis to cis-2-benzhydryl-3-aminoquinuclidine.—A solution of 11.0 g. (0.0329 mole) of cis-2-benzhydryl-3-acetamidoquinuclidine in 60 ml. of 6 N HCl was refluxed for 23 hours. The cool reaction mixture was made alkaline with dilute NaOH followed by extraction with $CH_2Cl_2$. After drying the organic layer over $MgSO_4$, the solvent was removed in vacuo leaving 9.8 g. of a white solid which melted at 179–183° C. By TLC (micro alumina plate; 2.5% isopropanol-ether; $I_2$), the product showed $R_f$ value of the previously obtained cis isomer.

EXAMPLE 7

Cis and trans-2-benzhydryl-3-aminoquinuclidine via and Leuckart reaction

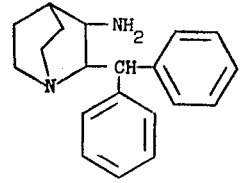

2-benzhydryl-3-quinuclidinone, 1.0 g. was mixed with 2.0 g. of ammonium formate in 15 ml. of formamide and heated in an oil bath at 184° C. overnight. After cooling, the reaction mixture was poured into 500 ml. of water and extracted several times with $CH_2Cl_2$, resulting in the formation of an emulsion which was broken by filtering through Celite. This extract was dried with $MgSO_4$, filtered, and concentrated in vacuo to yield 0.96 g. of a glassy material;

$\lambda_{max.}^{Nujol}$ 3.05 (m.)

6.02 (s.)$\mu$ (no ketone carbonyl absorption); TLC (micro alumina plate; 5% isopropanol-ether; $I_2$) showed two components in approximately equal amounts. This material was dissolved in 20 ml. of 6 N HCl and refluxed overnight. The solution was cooled, made alkaline with $K_2CO_3$, extracted with $CH_2Cl_2$ and dried with $MgSO_4$.

Filtration and concentration of the filtrate in vacuo gave 0.79 mg. of a solid;

$\lambda_{max.}^{Nujol}$ 2.98 ($\omega$) $\mu$ (no amide carbonyl absorption), TLC (micro alumina plate; 2.5% isopropanol-ether; $I_2$) showed two components of ca. equal amounts. Recrystallization from heptane gave 0.36 g., M.P. 155–166° C. which by TLC was a mixture of amines with the cis isomer in preponderance.

EXAMPLE 8

Cis-2-(benzhydryl-3-quinuclidinol mesylate

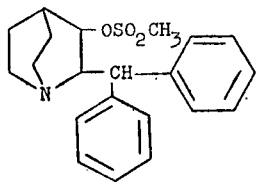

Cis-2-benzhydryl-3-quinuclidinol, 6.0 g. (0.020 mol.), was dissolved in 60 ml. of pyridine, cooled in an ice-water mixture and treated with 5.5 ml. (0.07 mol.) of mesyl chloride. After stirring for 15 minutes in the cold, the solution was left at room temperature overnight. It was again cooled to 0–5° C. and treated with 1,1,1,2 and 5-ml. portions of water at 5 minute intervals. The entire contents was poured into one liter of water, treated with excess $K_2CO_3$ and extracted with $CH_2Cl_2$. The organic layer was washed with saturated saline solution and dried with $MgSO_4$. Filtration and concentration in vacuo (vacuum pump near the end) gave 6.4 g. of a brown solid. TLC analysis on alumina microplates with $CH_2Cl_2$ ($I_2$ detection) showed a major component (most mobile), a less mobile impurity and some unreacted alcohol near the origin. Thus, this material was again taken up in pyridine and treated with mesyl chloride as outlined above. The same workup yielded a residue which on trituration with ether yielded 6.4 g. of a solid. TLC analysis showed now only a minute amount of the starting alcohol. This material recrystallized from ethanol by concentration to 125 ml. where a solid started to appear followed by standing at room temperature overnight. The resulting solid, 3.75 g. (M.P. 189–192° C.), showed a small impurity by TLC. A second recrystallization from ethanol (concentrated to 100 ml.) yielded 3.22 g., M.P. 194–196° C.;

$\lambda_{max.}^{Nujol}$ 8.52 (s.) $\mu$

The analytical specimen, obtained by drying a portion of this material in a drying pistol over refluxing methanol, exhibited M.P. 196–198° C.

Analysis.—Calc'd for $C_{21}H_{25}NSO_3$ (percent): C, 67.89; H, 6.78; N, 3.78; S, 8.63. Found (percent): C, 67.76; H, 6.59; N, 3.57; S, 8.53.

EXAMPLE 9

Trans-2-benzhydryl-3-azido quinuclidine

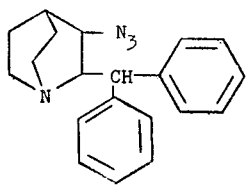

Cis-2-benzhydryl-3-o-mesyl quinuclidinol, 1.5 g., (0.004 mole), and sodium azide, 0.78 g. (0.012 mol.), were mixed in 30 ml. of dimethyl acetamide and 1.2 ml. of water. This solution was heated with an oil bath at 90° C. for 16 hours and then with a steam bath for a total of 23 hours. The solution was cooled and the contents were poured into 1 liter of cold water, and stirred for 30 minutes. The resulting solid was collected by filtration and dried to yield 0.85 g., M.P. 147–155° C. TLC (alumina micro plates; $CH_2Cl_2$; $I_2$ detection) showed only only component which was more mobile then the precursor cis mesylate. Extraction of the filtrate with $CH_2Cl_2$ yielded an oil which showed, in addition to dimethyl acetamide, some azide, but mostly unreacted mesylate. A portion of the above solid was recrystallized from ethanol and dried in a drying pistol to yield the analytical specimen, M.P. 157° C.;

$\lambda_{max.}^{Nujol}$ 4.78 (s.) $\mu$

TLC showed one component with the same $R_f$ as before recrystallization.

Analysis.—Calc'd for $C_{20}H_{22}N_4$ (percent): C, 75.44; H, 6.96; N, 17.60. Found (percent): C, 75.54; H, 6.57; N, 17.43.

EXAMPLE 10

Trans-2-benzhydryl-3-aminoquinuclidine

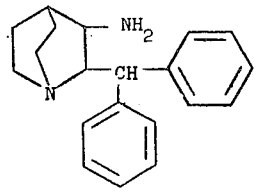

Trans-2-benzhydryl-3-azido quinuclidine, 1.0 g. (0.00315 mol., M.P. 155–156° C.) was dissolved in 75 ml. of ether and added portionwise to a suspension of 400 mg. lithium aluminum hydride (LAH) in ether. The solution was stirred at room temperature for 30 minutes and refluxed for 2 hours. Upon cooling, excess LAH was destroyed with saturated sodium sulfate solution and the ether solution was decanted. The remaining salts were triturated several times with ether, the ether extracts were combined and dried with $MgSO_4$. Filtration and concentration in vacuo gave 1.0 g. of a solid. TLC analysis on alumina micro plates using 2.5% isopropanol-ether with $I_2$ detection showed only the trans amine, M.P. 129–133° C.

Analysis.—Calc'd for $C_{20}H_{24}N_2$ (percent): C, 82.14; H, 8.27; N, 9.58. Found (percent): C, 81.98; H, 8.06; N, 8.92.

EXAMPLE 11

Trans-2-benzhydryl-3-N-benzylaminoquinuclidine

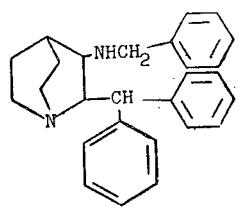

Trans - 2 - benzyhydryl - 3 - aminoquinuclidine, 1.0 g. (0.0034 mol.) was mixed with 0.72 g. (0.0068 mol.) of benzaldehyde in 30 ml. of benzene. A catalytic amount of p-toluene sulfonic acid was added and the solution was refluxed with water collection in a Dean-Stark trap. After 2 hours the solution was cooled and concentrated in vacuo to get a solid which still had the odor of benzaldehyde. The IR spectrum showed the presence of the Schiff base at 6.10 (m.) $\mu$. This material was dissolved in 10 ml. $CH_2Cl_2$ and 10 ml. methanol, cooled in an ice-water bath and treated portionwise with 0.5 g. of sodium borohydride. Stirring was continued overnight at room temperature. Solvent was removed in vacuo and the residue was triturated with water. The resulting solid was collected by filtration and dried to yield 1.17 g. TLC analysis on alumina micro plated in ether with $I_2$ detection showed only the trans - 2 - benzhydryl-3-N-benzylaminoquinuclidine. Recrystallization from 15 ml. isopropanol gave 0.90 g., M.P. 154.5–156° C. The analytical specimen was obtained by drying this material in a drying pistol and showed M.P. 154–155° C.;

$\lambda_{max.}^{Nujol}$ 13.50 (s.);

14.29–14.40 (s.) μ.

*Analysis.*—Calc'd for $C_{27}H_{30}N_2$ (percent): C, 84.77; H, 7.91; N, 7.32. Found (percent): C, 84.96; H, 8.05; N, 7.31.

EXAMPLE 12

2-(4,4'-dimethoxy)-benzhydryl-3-benzlimino-quinuclidine

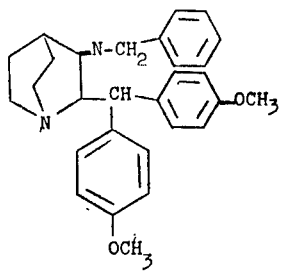

A solution of 4.0 g. (0.0142 mol.) of 2-(4,4'-dimethoxy)benzhydrylquinuclidin-3-one, 3.05 g. (0.0285 mol.) of benzylamine, 30 ml. of toluene, and a catalytic amount of p-toluenesulfonic acid was refluxed overnight and 0.18 mol. of water (theoretical, 0.25 ml.) was collected in a Dean-Stark trap. The solvents were removed in vacuo, benzylamine being removed with a vacuum pump. Trituration of the gummy yellow solid residue with isopropanol gave a white solid which was collected by suction filtration giving 5.18 g. of crude product;

$\lambda_{max.}^{Nujol}$ 6.04μ

A 2.0 g. sample was recrystallized from isopropanol to give 1.19 g. of a white solid, M.P. 121–128° C. After drying this analytical sample in an Abderhalden over refluxing methanol, the melting point was 123–128° C.

*Analysis.*—Calc'd for $C_{29}H_{32}N_2O_2$ (percent): C, 79.06; H, 7.32; N, 6.36. Found (percent): C, 79.36; H, 7.17; N, 6.39.

EXAMPLE 13

Cis-2-(4,4'-dimethoxy)benzyhydryl-3-N-benzylamino-quinuclidine

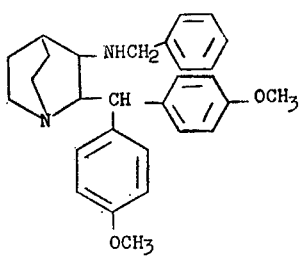

While a solution of 4.38 g. (9.96 mol.) of 3-N-benzyl-imino-2-(4,4'-dimethoxy)benzhydrylquinuclidine in ca. 50 ml. of $CH_2Cl_2$ and ca. 75 ml. of ethanol was cooled with an ice bath, 1.0 g. (0.0264 mol.) of sodium borohydride was added portionwise over a period of 0.5 hour. After the addition was complete, the reaction mixture was stirred at ice-bath temperature for one hour, and then it was left at room temperature overnight. The solvent was removed in vacuo leaving a white solid to which was added water followed by extraction with $CH_2Cl_2$. After washing the organic layer with saturated saline solution, it was dried over $MgSO_4$. Removal of the drying agent and solvent left 4.41 g. of a gum which by TLC (micro alumina plate; ether; $I_2$) was ca. 60% of the cis isomer and ca. 40% of the trans isomer. The 4.41 g. was absorbed on 20 g. of neutral alumina and applied by gravity to a column of 380 g. of neutral alumina packed with pet ether (Baker grade). Elution was carried out with pet ether, pet ether-benzene, benzene and benzene-$CH_2Cl_2$ and $CH_2Cl_2$. The cis isomer was obtained by elution with 5, 10, 15, 20, 25, and 50% ether-methylene chloride to give 2.0 g. of crude product. Elution with ether gave 1.95 g. of a mixture of the cis and trans isomers. Recrystallization of the cis isomer from isopropanol gave 1.44 g. of a white solid melting at 154–155° C. which was homogeneous by TLC. After drying the sample in an Abderhalden over refluxing methanol the melting point was unchanged.

*Analysis.*—Calc'd for $C_{29}H_{34}N_2O_2$ (percent): C, 78.70; H, 7.74; N, 6.33. Found (percent): C, 78.89; H, 7.99; N, 6.12.

EXAMPLE 14

Cis-2-(4,4'-dimethoxy)benzhydryl-3-aminoquinuclidine

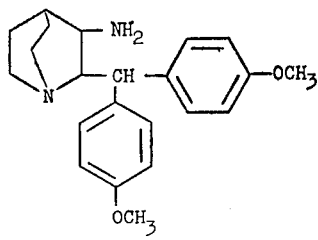

The hydrochloride salt of 1.56 g. (3.53 mmol) of cis-2-(4,4' - dimethoxy)benzhydryl - 3 - N - benzylamino-quinuclidine was prepared by passing HCl (g.) into a methanol solution of the amine followed by concentration in vacuo to remove any excess acid. The salt was then hydrogenated in ca. 200 ml. of methanol at 250 p.s.i. and 90° C. for 5.5 hours using 1.5 g. of 10% Pd/C. The catalyst was removed by filtration through Celite followed by concentration of the filtrate in vacuo, leaving 1.4 g. of a brown glass. The hydrochloride salt was taken to the free base using dilute NaOH followed by extraction with $CH_2Cl_2$. After drying the organic layer over $MgSO_4$, the solvent was removed in vacuo to yield 0.78 g. of a brown solid. Recrystallization from cyclohexane (charcoal) gave 0.60 of a white solid melting at 154–156° C.;

$\lambda_{max.}^{Nujol}$ 2.97 (w.) μ

By TLC (micro alumina plate; 5% isopropanol-ether; $I_2$), the product was homogeneous. After drying this solid in an Abderhalden over refluxing methanol, the melting point was unchanged.

*Analysis.*—Calc'd for $C_{22}H_{28}N_2O_2$ (percent): C, 74.96; H, 8.01; N, 7.95. Found (percent): C, 74.99; H, 8.07; N, 7.69.

EXAMPLE 15

Cis-2-(4,4'-dichloro)benzhydryl-3-o-mesyl-quinuclidinol

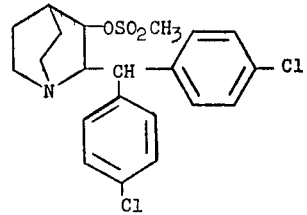

After a solution of 7.0 g. (0.0193 mol.) of cis-2-(4,4'-dichloro)-benzhydrylquinuclidin-3-ol in 150 ml. of anhydrous pyridine and 50 ml. of methylene chloride was cooled to 0° C. with a NaCl ice-bath, 5.5 ml. of mesyl chloride was added followed by stirring at 0° C. for 2 hours, and then it was stirred overnight at room temperature. While the reaction mixture was cooled with an ice bath, 1, 1, 1, 2, and 5 ml. of water were added at 5 minute intervals. Then the reaction mixture was poured into 900 ml. of water, made basic with excess $2NK_2CO_3$, and

15 extracted with CH₂Cl₂. After drying the organic layer over MgSO₄, the solvent was removed in vacuo, the last traces of pyridine being removed by codistillation with ethanol. By TLC, the 9.4 g. of dark brown glass residue was about an equal mixture of starting material and a more mobile spot (micro alumina plate; CH₂Cl₂;I₂). The crude 9.4 g. was dissolved in 70 ml. of anhydrous pyridine; cooled to 0° C. and treated with 5.5 ml. of mesyl chloride as previously described. The workup gave 9.3 g. of a dark brown oil which by TLC contained only a trace of the starting material and three more mobile spots, one prepondering. The brown oil was taken up in a minimum of ethanol, and the cyclohexane was added. With scratching, a brown solid formed which was collected by suction filtration and dried giving 3.98 g. (46.8% of theory) of crude material which was homogeneous by TLC. Recrystallization from cyclohexane gave 3.46 g. of light yellow needles which melted at 111–113° C., resolidified and melted at 115° C. After drying in an Abderhalden over refluxing methanol, the melting point was 177–178° C. An elemental analysis showed that the solid contained some cyclohexane.

*Analysis.*—Calcd. for $C_{21}H_{23}Cl_2NO_3S \cdot C_6H_{12}$ (percent): C, 61.82; H, 6.73; N, 2.67; Cl, 13.52; S, 6.11. Found (percent): C, 61.35; H, 6.68; N, 2.77; Cl, 14.18; S. 6.21.

Recrystallization from isopropanol gave 2.64 g. of a light yellow solid which melted at 182–184° C. After drying the sample in an Abderhalden over refluxing methanol, the melting point was 182.0–183.5° C.

*Analysis.*—Calcd. for $C_{21}H_{23}Cl_2NO_3S$ (percent): C, 57.27; H, 5.27; N, 3.68; Cl,16.10; S, 7.28. Found (percent): C, 57.22; H, 5.15; N, 3.10; Cl, 16.10; S, 7.24.

EXAMPLE 16

Trans-2-(4,4′-dichloro)benzhydryl-3-azidoquinuclidine

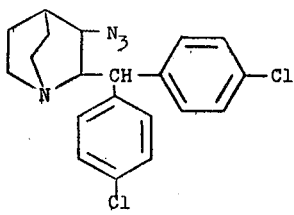

A mixture of 3,43 g. (0.0078 mol.) of cis-2-(4,4′-dichloro)benzhydryl - 3 - o - mesyl-quinuclidinol, 1.52 g. (0.0234 mol.) of sodium azide, 50 ml. of dimethyl acetamide, and 2 ml. of water was heated at 135–140° C. overnight using a silicone oil bath (condenser was used). The cool reaction mixture was then poured into ca. 1.1 l. of water followed by stirring at room temperature for 3 hours. The resulting precipitate was collected by suction filtration, washed with water, dissolved in CH₂Cl₂ and dried over MgSO₄. Removal of the drying agent and solvent left 2.68 g. of a yellow solid ($\lambda_{max.}^{Nujol}$ 4.77 (s.) $\mu$)

which by TLC (micro alumina plate; CH₂Cl₂; I₂) was predominantly one spot with a trace of impurity which did not correspond to the starting material. Recrystallization from isopropanol gave two crops of white needle crystals: (1) 1.62 g., M.P. 173–174° C. (dec.); (2) 0.10 g., M.P. 170–171° C. (dec.). By TLC both crops were identical and homogeneous. Total yield: 1.72 g. (57%). The analytical sample was prepared by drying the first crop in an Abderhalden over refluxing methanol after which the melting point was unchanged.

*Analysis.*—Calc'd for $C_{20}H_{20}Cl_2N_4$ (percent): C, 62.02; H, 5.21; N, 14.47; Cl, 18.31. Found (percent): C, 62.04; H, 5.14; N, 14.05; Cl, 18.03.

16

EXAMPLE 17

Trans-2-(4,4′-dichloro)benzhydryl-3-aminoquinuclidine

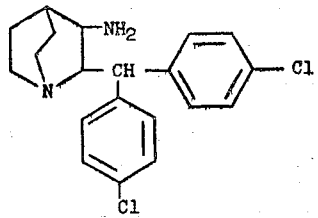

To a suspension of 400 mg. (10.5 mol.) of lithium aluminum hydride (LAH) in a small amount of anhydrous ether was added dropwise 1.24 g. (3.50 mol.) of trans - 2 - (4,4′-dichloro)benzhydryl-3-azidoquinuclidine dissolved in ca. 110 ml. of anhydrous ether. After the addition was complete (20 minutes), the reaction mixture was stirred at room temperature for 3.5 hours followed by the dropwise addition of saturated Na₂SO₄ solution to destroy the unreacted LAH. The ether was then decanted, and the salts were washed thoroughly with anhydrous ether. After the organic extract was dried over MgSO₄, the solvent was removed in vacuo leaving 1.21 g. of a crude white solid melting at 163.5–167° C.

$\lambda_{max.}^{Nujol}$ 2.98 (w.)

3.02 (w.) $\mu$. By TLC (micro alumina plate; 5% isopropanol-ether; I₂), the crude solid was predominantly one spot with a trace of impurity at the base line. Recrystallization from cyclohexane gave 0.97 g. (77% of theory) of white solid, M.P. 165–167° C.; the IR was unchanged. After drying in an Abderhalden over refluxing acetone, the melting point was unchanged.

*Analysis.*—Calc'd for $C_{20}H_{22}Cl_2N_2$ (percent): C, 66.48; H, 6.14; N, 7.76; Cl, 19.62. Found (percent): C, 66.76; H, 6.22; N, 7.51; Cl, 19.43.

Cis and trans-2-(4,4′-dichlorobenzhydryl)-3-aminoquinuclidine via the Leuckart reaction 2-(4,4′-dichlorobenzhydryl)-3-quinuclidinone, 5.0 g., was mixed with 5.0 g. of ammonium formate in 40 ml. of formamide and warmed in an oil bath. The solution became homogeneous at 150° C. and the temperature was raised to 170° C. and held overnight. After cooling, excess potassium carbonate was added and the solution was poured into 1 liter of water. A white solid separated which was collected by filtration (IR showed no ketone carbonyl) dissolved in ether and dried with MgSO₄. Filtration and concentration of the filtrate in vacuo gave 4.15 g. of a glassy solid. The aqueous solution was extracted with ether, dried and freed from solvent to yield an additional 1.28 g. Trituration of the combined material with methylene chloride gave a crystalline material and the solvent was removed in vacuo; TLC (micro alumina plate; 5% isopropanol-ether; I₂) showed two components in ca. equal amounts. Recrystallization of this material from 40 ml. of isopropanol gave 4.43 g. The analytical specimen obtained by drying 0.6 g. in a drying pistol showed M.P. 204–209° C.;

$\lambda_{max.}^{Nujol}$ 3.07 (m.), 6.03 (s.) $\mu$

*Analysis.*—Calc'd for $C_{21}H_{22}N_2OCl_2 \cdot C_3H_8O$ (percent): C, 64.13; H, 6.73; N, 6.24. Found (percent): C, 63.69; H, 6.59; N, 6.15.

The remainder of the material was treated with 35 ml. of 6 N HCl and refluxed overnight. On cooling, the reaction mixture to room temperature, a solid separated. A portion was collected by filtration and dried. Its IR spectrum (Nujol) showed salt band but no amide carbonyl. All of the material was then treated with aqueous NaOH solution containing 8.5 g. of sodium hydroxide and extracted with CH₂Cl₂. This extract was washed twice with saturated sodium chloride solution, dried with MgSO₄, filtered, and the filtrate was concentrated in vacuo to yield 3.6 g. of a solid, M.P. (softens 143° C.) 148° C., clear at 155° C.; TLC (micro alumina plate; ether; I₂) showed two components in ca. equal amounts.

EXAMPLE 18

Cis-2-(4,4'-difluoro)benzhydryl-3-o-mesyl-quinuclidinol

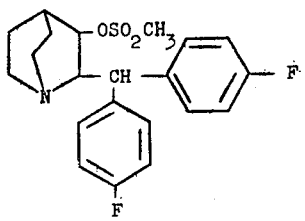

A solution of 6.58 g. (0.020 mol.) of cis-2-(4,4'-difluoro)benzhydrylquinuclidin-3-ol in 150 ml. of anhydrous pyridine and 50 ml. of methylene chloride was cooled to 0° C. with an ice-NaCl bath, and then 5.5 ml. (0.070 mol.) of mesyl chloride was added followed by stirring at 0–5° C. for 2 hours and then overnight at room temperature. While the reaction mixture was cooled with an ice bath, 1, 1, 1, 2, and 5 ml. portions of water were added at 5 minute intervals. Then the mixture was poured into 1 l. of water followed by making alkaline with excess K₂CO₃ and extraction with CH₂Cl₂. After drying the organic layer over MgSO₄, the solvent was removed in vacuo (the last traces of pyridine being removed by codistillation with ethanol) leaving 7.8 g. of a brown solid. By TLC (micro alumina plate; CH₂Cl₂; I₂), the material was ca. a 1:1 mixture of the starting alcohol and a more mobile component. The crude 7.8 was again reacted with mesyl chloride as described above. The work-up gave 8.3 g. of crude brown solid which by TLC was predominantly the more mobile spot plus a trace of the starting alcohol. Recrystallization from ethanol gave 4.32 g. of a dark brown solid, M.P. 176–180° C., resolidifies and melts 200° C. (dec.). Recrystallization again from ethanol (charcoal) gave two crops of light brown solid: (1) 3.73 g., M.P. 181.5–183.5° C. resolidifies and melts 205° C. (dec.); (2) 0.12 g., M.P. 180–181° C. resolidifies and melts 205° C. (dec.). The total yield was 3.85 g. (47.4% of the theoretical). By TLC both crops were identical and homogeneous. The analytical sample was prepared by drying a 0.8 g. sample of the first crop in an Abderhalden over refluxing toluene after which the melting point was 182–183° C. resolidify and melt 204–205° C. (dec.)

*Analysis.*—Calc'd for $C_{21}H_{23}F_2NO_3S$ (percent): C, 61.90; H, 5.69; N, 3.44; S, 7.87. Found (percent): C, 62.02: H. 5.64: N, 3.33; S, 7.73.

EXAMPLE 19

Trans-2-(4,4'-difluoro)benzhydryl-3-azidoquinuclidine

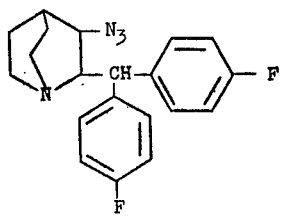

A mixture of 2.73 g. (0.00672 mol.) of cis-2-(4,4'-difluoro)benzhydryl-3-o-mesylquinuclidinol, 1.31 g. 0.0202 mol.) of sodium azide, 40 ml. of dimethyl acetamide and 1.6 ml. of water was heated with a silicon oil bath at 105–110° C. for 20 hours. When the reaction mixture was cool, it was poured into 1 l. of water and stirred for 5 hours at room temperature. The resulting light brown precipitate was collected by suction filtration giving 2.0 g. of material which, by TLC (micro alumina plate: CH₂Cl₂; I₂), did not contain any of the starting material but consisted of a more mobile spot and a trace amount of less mobile impurity. Recrystallization from ethanol gave two crops of tan solid: (1) 1.32 g., M.P. 138–140° C. resolidify and melt 145° C.; 2) 0.16 g., M.P. 138.5–140.0° C. By TLC, both crops were identical and homogeneous. The total yield was 1.48 g. (62.3% of theoretical). The first crop was recrystallized again from ethanol giving 1.14 g. of a white solid melting 138–140° C. resolidify and melt 145° C. The analytical sample was prepared by drying the 1.14 g. in an Abderhalden over refluxing methanol after which the melting point was unchanged.

*Analysis.*—Calc'd for $C_{20}H_{20}F_2N_4$ (percent); C, 67.78; H, 5.68; H, 15.81. Found (percent): C, 67.83; H, 5.75; H, 15.68.

EXAMPLE 20

Trans-2-(4,4'-difluoro)benzhydryl-3-aminoquinuclidine dihydrochloride hydrate

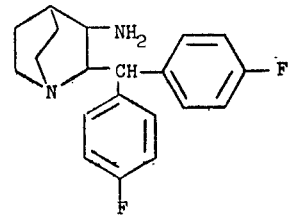

To a suspension of 400 mg. (0.0105 mol.) of lithium aluminum hydrate in a small amount of anhydrous ether was added dropwise 1.0 g. (0.00282 mol.) of trans-2-(4, 4'-difluoro)benzhydryl-3-azidoquinuclidine dissolved in ca. 75 ml. of anhydrous ether over a period of 0.5 hour. After the addition was complete, the reaction mixture was stirred at room temperature for 3.5 hours, and then the excess LAH was destroyed by the dropwise addition of saturated sodium sulfate solution. The ether was decanted and the salts were washed thoroughly with anhydrous ether. The combined organic washings were dried over MgSO₄ after which the solvent was removed in vacuo leaving 0.98 g. of a white solid. By the IR spectrum in nujol, no azide remained. Also by TLC (micro alumina plate; ether; I₂), the product contained none of the the starting material. The dihydrochloride salt which was recrystallized from ethanol giving two crops of white solid: (1) 0.51 g., M.P. 235° C. (dec.); (2) 0.6 g., M.P. 238.5–240° C. (dec.). The analytical sample was prepared by drying the first crop in an Abderhalden over refluxing methanol after which the melting point was 235–237° C. (dec.).

*Analysis.*—Calc'd for $C_{20}H_{24}Cl_2F_2N_2 \cdot HO_2$ (percent): C, 57.55; H, 6.25; N, 6.69; Cl, 16.91. Found (percent): C, 57.55; H, 6.25; N, 6.67; Cl, 16.40.

EXAMPLE 20A

Cis and trans-2-(4,4'-difluoro)benzhydryl-3-aminoquinuclidine via the Leuckart reaction 2 - (4,4' - difluoro)benzhydryl-3-quinuclidinone, 6.0 g., was mixed with 6.0 g. of ammonium formate in 40 ml. of formamide and heated overnight at 172° C. in an oil-bath. The cooled solution was treated with excess K₈CO₃ and poured into 1 l. of water. This solution was extracted several times with ether, the combined extract was dried with MgSO₄, filtered and the filtrate was concentrated in vacuo to yield 5.39 g. of a glass material.

$\lambda_{max.}^{CHCl_3}$ 5.95 (s.) $\mu$

TLC (micro alumina plate, 5% isopropanol-ether; I₂) showed two components in ca. equal amounts. Recrystallization from isopropanol gave 3.40 g., a portion of which was dried in a Drying Pistol and showed M.P. 179–190° C.;

$\lambda_{max.}^{Nujol}$ 3.08 (m.)

5.94(s), 6.05(s)μ;

$\lambda_{max.}^{CHCl_3}$ 5.93 (s.) μ

*Analysis.*—Calc'd for $C_{21}H_{22}N_2OF_2$ (percent): C, 70.75; H, 6.22; N, 7.86. Found (percent): C, 70.63; H, 6.36; N, 7.81.

The filtrate was concentrated and the residue was combined with the remainder of the solid, treated with 35 ml. of 6 N HCl and refluxed overnight. An aqueous sodium hydroxide solution followed by extraction with $CH_2Cl_2$. This extract was washed several times with saturated saline solution and dried with $MgSO_4$. Removal of the drying agent and concentration in vacuo gave 3.84 g. of a glassy solid. Its infrared spectrum ($CHCl_3$) did not show any carbonyl absorption. TLC (micro alumina plate; ether; $I_2$) showed two components in ca. equal amounts.

EXAMPLE 21

Preparation of 2-(4-fluoro)-benzylidenyl-3-quinuclidinone

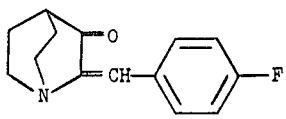

A solution of 3-quinuclidinone (12.50 g., 0.10 M), 12.40 g. (0.10 M.) of p-fluorobenzaldehyde, 25 ml. of ethanol, and one pellet of sodium hydroxide was refluxed for 2.5 hours and then stirred at room temperature overnight. A yellow precipitate had formed which was collected, washed with small amount of ethanol and then with water yielding 20.90 g. (90.5% of theory) which melted at 118.5–120.5° C.

EXAMPLE 22

Preparation of 2-(4,4'-difluoro) benzhydryl-3-quinuclidinone

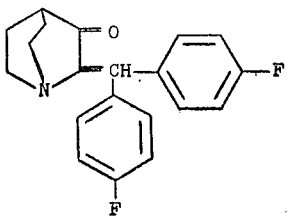

The Grignard reagent was prepared in the usual way using 175 g. (1.0 M) of 4-bromofluorobenzene in ca. 900 ml. of anhydrous ether, 26.7 g. (1.1 M) of magnesium turnings and a trace of iodine. While this solution was cooled with an ice bath, 151 g. (0.65 M) of 2-(4-fluoro)benzylidenyl-3-quinuclidinone dissolved in 1900 ml. of benzene was added dropwise over a period of 6.5 hours. After the addition was complete, stirring was continued at ice bath temperature for one hour followed by stirring overnight at room temperature. While the reaction mixture was cooled with an ice bath, 50 ml. of water was added dropwise followed by stirring at room temperature for one hour. The magnesium salts were separated by suction filtration through Celite with thorough washing of the salts with tetrahydrofuran. After the filtrate was concentrated in vacuo, the residue was taken up in methylene chloride and dried over magnesium sulfate. Removal of the magnesium sulfate and methylene chloride left a yellow semisolid which was crystallized from ethanol by dissolving it in ca. 1.8 l. of hot ethanol and then concentrating it to ca. 1 liter. Two crops of white solid were obtained: (1) 129.9 g., M.P. 162–164° C.; (2) 13.24 g., M.P. 160.0–162.5° C. Total yield: 143.1 g. (67.5% of theory).

EXAMPLE 23

2-(4-bromo)benzylidenyl-3-quinuclidinone

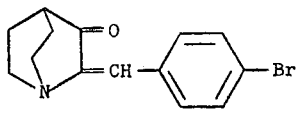

A solution of 7.10 g. (0.0566 M) of 3-quinuclidinone, 10.48 g. (0.0566 M) of 4-bromobenzaldehyde, 30 ml. of ethanol, and two pellets of NaOH was refluxed for 3.5 hours. Upon cooling a yellow precipitate formed which was collected by suction filtration, washed with ethanol and then water, and dried giving 13.96 (84.5%) of yellow solid melting 125–126° C. The analytical sample was prepared by recrystallizing 2.00 g. from about 10 ml. of ethanol to yield 1.76 g. of a yellow solid, M.P. 125–126° C. Drying in an Abderhalden over refluxing methanol did not change the melting point.

*Analysis.*—Calc'd for $C_{14}H_{14}BrNO$ (292.18) (percent): C, 57.55; H, 4.83; N, 4.80; Br, 27.35. Found (percent): C, 57.37; H, 4.90; N, 4.59; Br, 27.25.

EXAMPLE 24

2-(4,4'-dibromo)benzhydryl-3-quinuclidinone

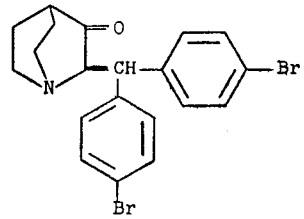

The Grignard reagent was prepared in the usual way, using 7.25 g. (0.0307 M) of p-dibromobenzene in 100 ml. of anhydrous ether, 0.82 g. (0.0338 M) of magnesium turnings, a trace of iodine and a few drops of 1,2-dibromoethane to initiate the reaction. After refluxing for 2.75 hours the reaction mixture was cooled with an ice bath while 6.00 g. (0.0205 M) of 2-(4-bromo)benzylidenyl-3-quinuclidinone dissolved in 200 ml. of benzene was aded dropwise over a period of 2.5 hours. After stirring at room temperature overnight, a few ml. of water were added dropwise after which it was stired at room temperature for 0.5 hour. Then the reaction mixture was filtered through Celite, the magnesium salts being thoroughly washed with tetrahydrofuran. Concentration of the filtrate in vacuo left a yellow liquid residue which was taken up in methylene chloride and dried over $MgSO_4$. Removal of the $MgSO_4$ and methylene chloride left 10.1 g. of taffy-like material which crystallized upon trituration with ethanol giving two crops of light yellow solid: (1) 3.72 g., M.P. 186–188° C. cloudy; (2) 0.08 g., M.P. 182–189° C. Recrystallization of the first crop from ethanol (charcoal) gave two crops of light yellow solid: (1) 2.94 g., M.P. 191–193° C.; (2) 0.21 g., M.P. 183–189° C. The total yield was 32%. The analytical sample was prepared by drying the first crop in an Abderhalden at room temperature overnight after which the melting point was 191.0–192.5° C.

*Analysis.*—Calc'd for $C_{20}H_{19}Br_2NO$ (449.19) (percent): C, 53.48; H, 4.26; N, 3.12; Br, 35.59. Found (percent): C, 53.78; H, 4.32; N, 3.04; Br, 34.6 (yielded much soot).

EXAMPLE 25

When in the procedure of Example 21, p-fluorobenzaldehyde is replaced by an equal molar amount of p-chlorobenzaldehyde,
p-trifluoromethylbenzaldehyde,
p-methoxybenzaldehyde,
m,p-methylenedioxybenzaldehyde, and
p-aminobenzaldehyde, there are obtained 2-(4-chloro)benzylidenyl-3-quinuclidinone,
2-(4-trifluoromethyl)benzylidenyl-3-quinuclidinone,
2-(4-methoxy)benzylidenyl-3-quinuclidinone,
2-(3,4-methylenedioxy)benzylidenyl-3-quinuclidinone, and
2-(4-amino)benzylidenyl-3-quinuclidinone, respectively.

EXAMPLE 26

When in the procedure of Example 1, 2-benzylidenyl-3-quinuclidinone is replaced by an equal molar amount of 2-(4-chloro)benzylidenyl-3-quinuclidinone and bromobenzene is replaced by an equal molar amount of 4-bromochlorobenzene there is obtained 2-(4,4'-dichloro)benzhydryl-3-quinuclidinone.

EXAMPLE 27

When in the procedure of Example 1, 2-benzylidenyl-3-quinuclidinone is replaced by an equal molar amount of 2-(4-trifluoromethyl)benzylidenyl - 3 - quinuclidinone and bromobenzene is replaced by an equal molar amount of 4-bromotrifluoromethylbenzene there is obtained 2-(4,4'-ditrifluoromethyl)benzhydryl-3-quinuclidine.

EXAMPLE 28

When in the procedure of Example 1, 2-benzylidenyl-3-quinuclidinone is replaced by an equal molar amount of 2-(4-methoxy)benzylidenyl-3-quinuclidinone and bromobenzene is replaced by an equal molar amount of 4-bromomethoxybenzene there is obtained 2-(4,4'-dimethoxy)benzhydryl-3-quinuclidinone.

EXAMPLE 29

When in the procedure of Example 1, 2-benzylidenyl-3-quinuclidinone is replaced by an equal molar amount of 2-(3,4'-methylenedioxy)benzylidenyl-3-quinclidinone and bromobenezene is replaced by an equal molar amount of 4-bromo-1,2-methylenedioxybenzene there is obtained 2-(3,4,3',4'-dimethylenedioxy)benzhydryl-3-quinuclidinone.

EXAMPLE 30

When in the procedure of Example 1, 2-benzylidenyl-3-quinuclidinone is replaced by an equal molar amount of 2-(4-amino)benzylidenyl-3 - quinuclidinone and bromobenezene is replaced by an equal molar amount of 4-bromoaminobenzene there is obtained 2-(4,4'-diamino)benzhydryl-3-quinuclidinone.

EXAMPLE 31

When in the procedure of Example 3, 2-benzhydryl-3-quinuclidinone is replaced by an equal molar amount of each of the products of Examples 22, 24, 26, 27, 28, 29 and 30 there are obtained 2-(4,4'-difluoro)benzhydryl-3-N-benzylaminoquinuclidine,
2-(4,4'-dibromo)benzhydryl-3-N-benzylaminoquinuclidine,
2-(4,4'-dichloro)benzhydryl-3-N-benzylaminoquinuclidine,
2-(4,4'-ditrifluoromethyl)benzhydryl-3-N-benzylaminoquinuclidine,
2-(4,4'-dimethoxy)benzhydryl-3-N-benzylaminoquinuclidine,
2-(3,4,3',4'-dimethylenedioxy)benzhydryl-3-N-benzylaminoquinuclidine, and
2-(4,4'-diamino)benzhydryl-3-N-benzylaminoquinuclidine, respectively.

EXAMPLE 32

When in the procedure of Example 4, 2-benzhydryl-3-benzylaminoquinuclidine is replaced by an equal molar amount of each of the products of Example 31 there are obtained 2-(4,4'-difluoro)benzhydryl-3-aminoquinuclidine,
2-(4,4'-dibromo)benzhydryl-3-aminoquinuclidine,
2-(4,4'-dichloro)benzhydryl-3-aminoquinuclidine,
2-(4,4'-ditrifluoromethyl)benzhydryl-3-aminoquinuclidine,
2-(4,4'-dimethoxy)benzhydryl-3-aminoquinuclidine,
2-(3,4,3',4'-dimethylenedioxy)benzhydryl-3-aminoquinuclidine, and
2-(4,4'-diamino)benzhydryl-3-aminoquinuclidine, respectively.

While this invention has been described and exemplified in terms of its preferred embodiment, those skilled in the art will appreciate that modifications can be made without departing from the spirit and scope of the invention.

I claim:

1. A compound selected from the group consisting of the compounds of the formula

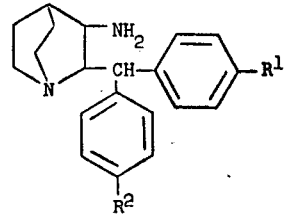

wherein $R^1$ and $R^2$ are both a member selected from the group consisting of hydrogen, chloro, bromo, fluoro, trifluoromethyl, methoxy, and methylenedioxy; and the pharmaceutically acceptable nontoxic salts thereof.

2. The compound of claim 1 having the formula

3. The compound of claim 1 having the formula

4. The compound of claim 1 having the formula

5. A pharmaceutically acceptable nontoxic salt of the compound of claim 4.
6. The fumarate salt of the compound of claim 4.
7. The cis-isomer of the compound of claim 4.
8. The trans-isomer of the compound of claim 4.
9. A pharmaceutically acceptable nontoxic salt of the compound of claim 7.
10. A pharmaceutically acceptable nontoxic salt of the compound of claim 8.
11. The fumarate salt of the compound of claim 7.
12. The fumarate salt of the compound of claim 8.

13. The compound of claim 1 having the formula

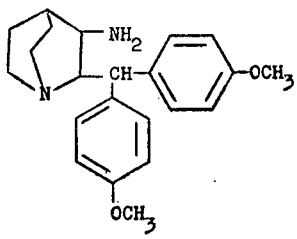

14. A compound selected from the group consisting of the compounds of the formula

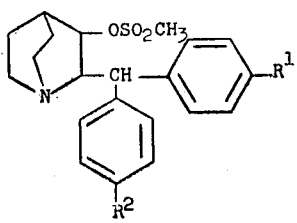

wherein $R^1$ and $R^2$ are both a member selected from the group consisting of hydrogen, chloro, bromo, fluoro, trifluoromethyl, methoxy, and methylenedioxy.

15. The compound of claim 14 wherein $R^1$ and $R^2$ are both hydrogen.

16. A compound selected from the group consisting of the compounds of the formula

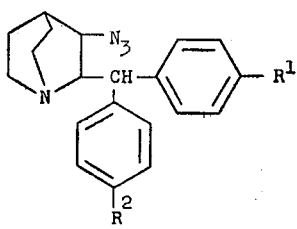

wherein $R^1$ and $R^2$ are both a member selected from the group consisting of hydrogen, chloro, bromo, fluoro, trifluoromethyl, methoxy, and methylenedioxy.

17. The compound of claim 16 wherein $R^1$ and $R^2$ are both hydrogen.

18. A compound selected from the group consisting of the compounds of the formula

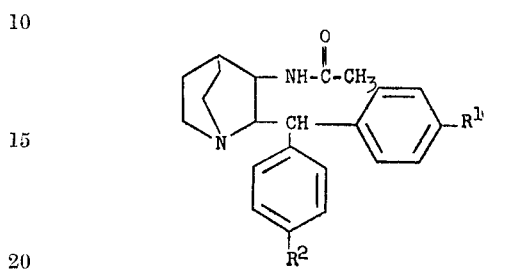

wherein $R^1$ and $R^2$ are both a member selected from the group consisting of hydrogen, chloro, bromo, fluoro, trifluoromethyl, methoxy, and methylenedioxy.

19. The compound of claim 18 wherein $R^1$ and $R^2$ are both hydrogen.

References Cited

UNITED STATES PATENTS

| | | | |
|---|---|---|---|
| 2,826,583 | 3/1958 | Hoffman et al. | 260—293 |
| 3,164,601 | 1/1965 | Thesing et al. | 260—294.7 |

HENRY R. JILES, Primary Examiner

G. THOMAS TODD, Assistant Examiner

U.S. Cl. X.R.

260—293.4, 294, 294.7; 424—267